May 24, 1966  B. W. ROSE ETAL  3,252,607
MACHINE FOR HANDLING EGGS
Filed Sept. 28, 1962  11 Sheets-Sheet 2
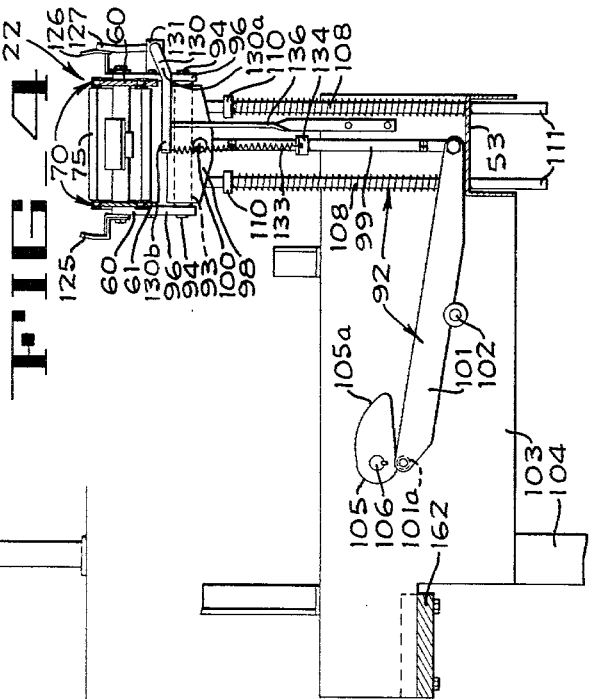
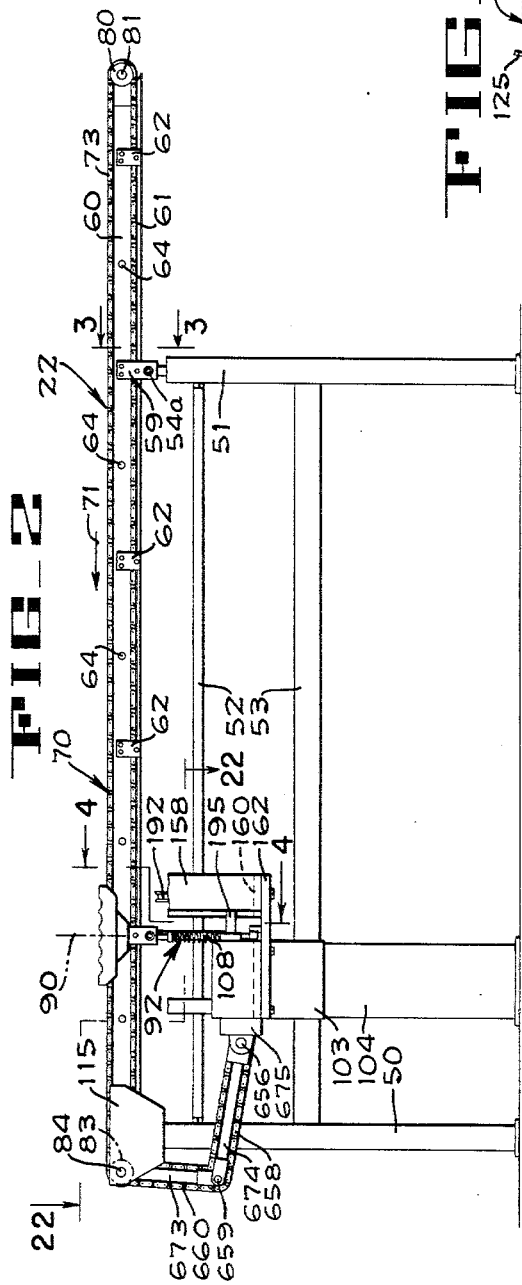
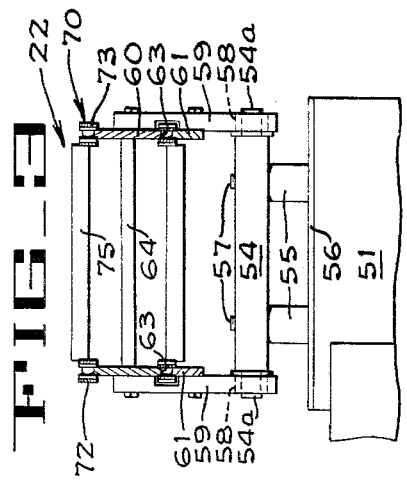
INVENTORS
BOYD W. ROSE
HAROLD J. MUMMA
BY Hans F. Hoffmeister
ATTORNEY

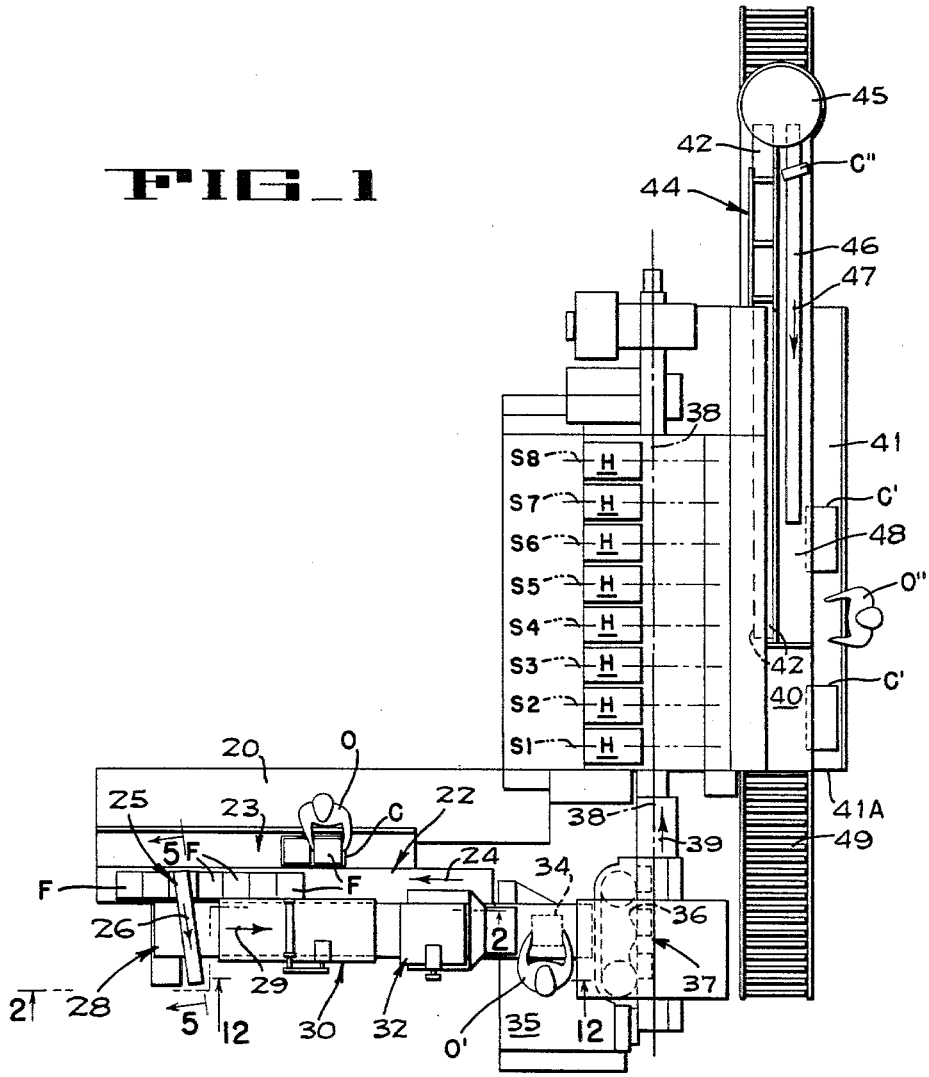

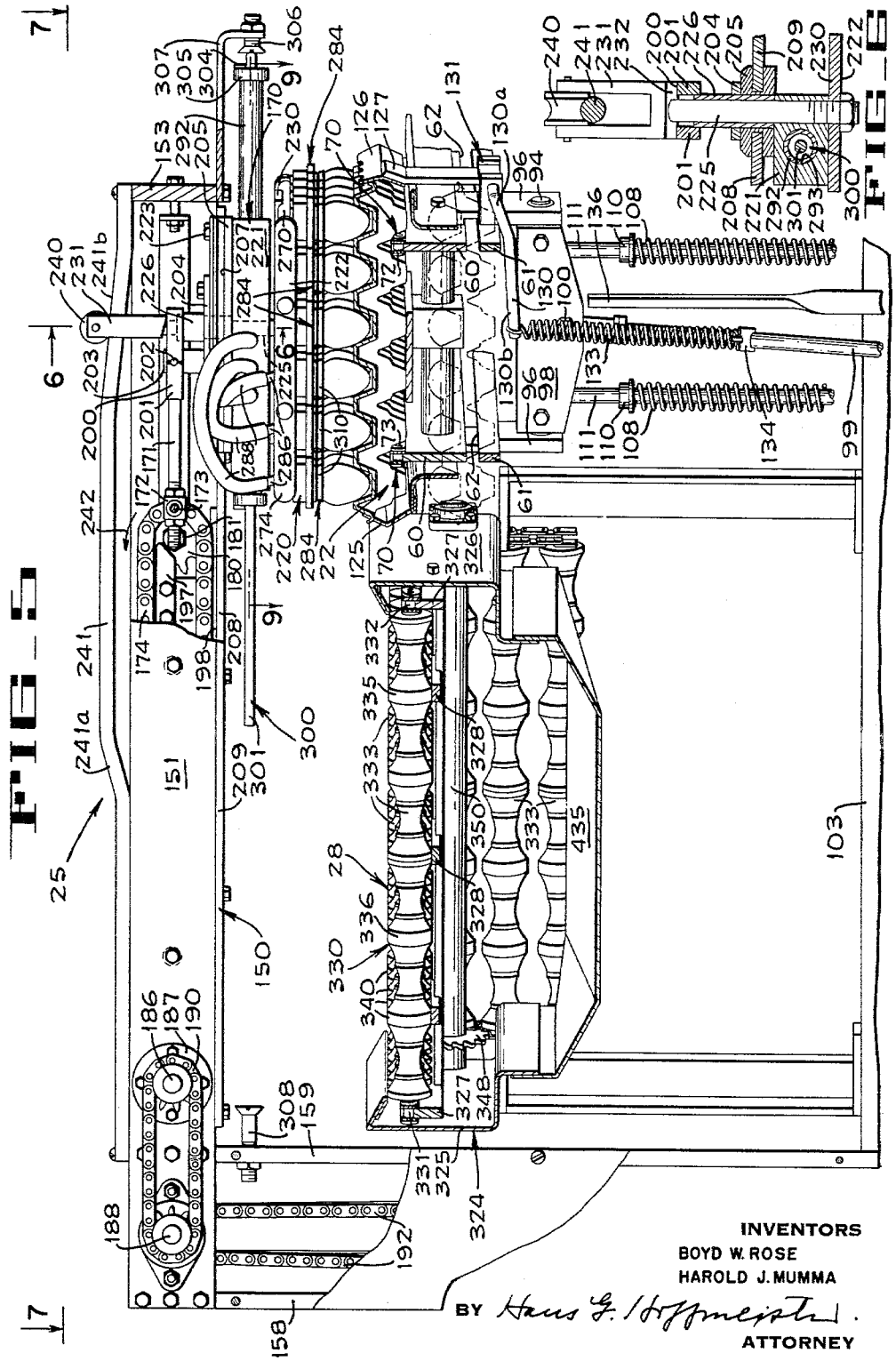

May 24, 1966
B. W. ROSE ET AL
3,252,607
MACHINE FOR HANDLING EGGS
Filed Sept. 28, 1962
11 Sheets-Sheet 4
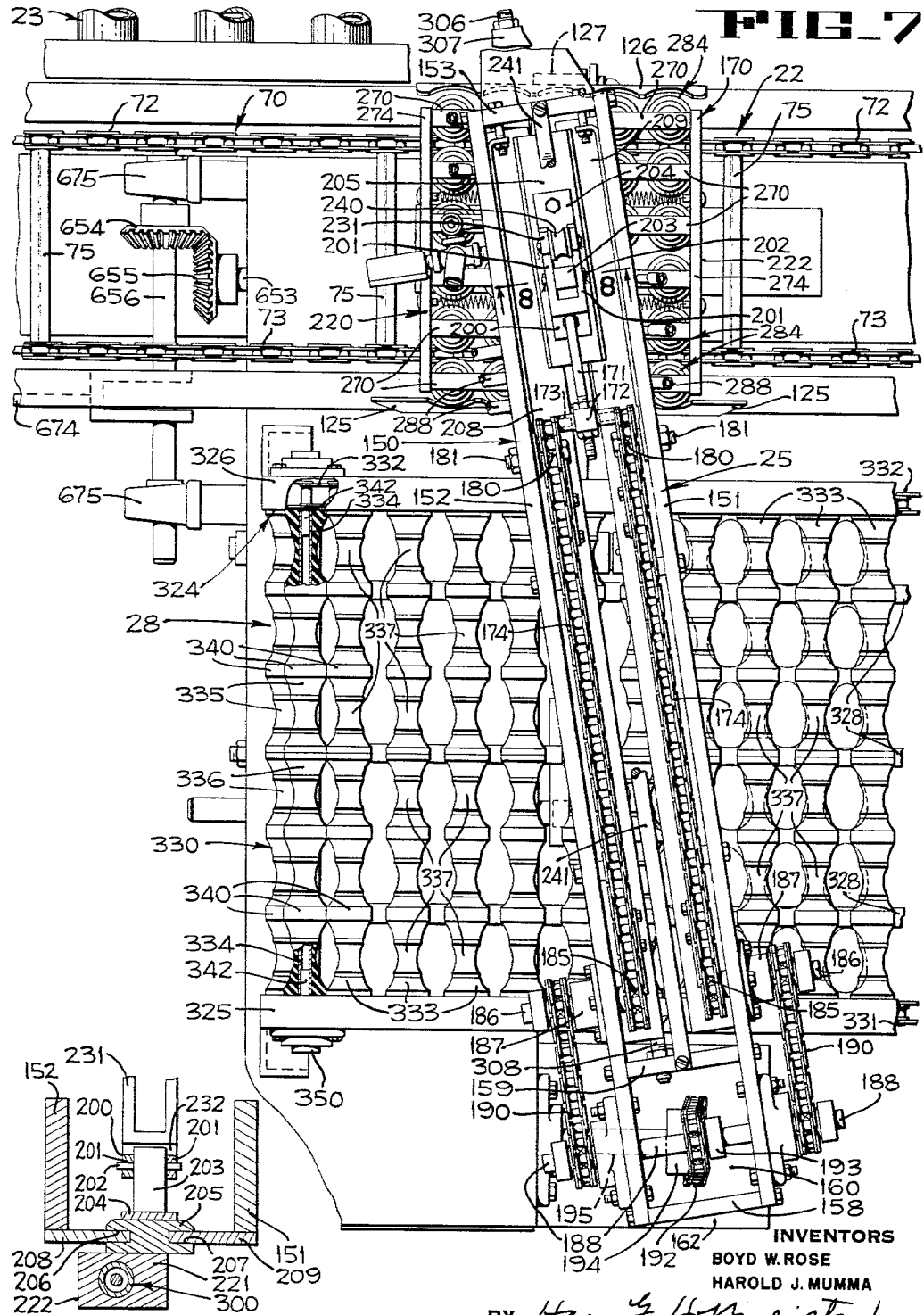
INVENTORS
BOYD W. ROSE
HAROLD J. MUMMA
BY Hans F. Hoffmeister
ATTORNEY

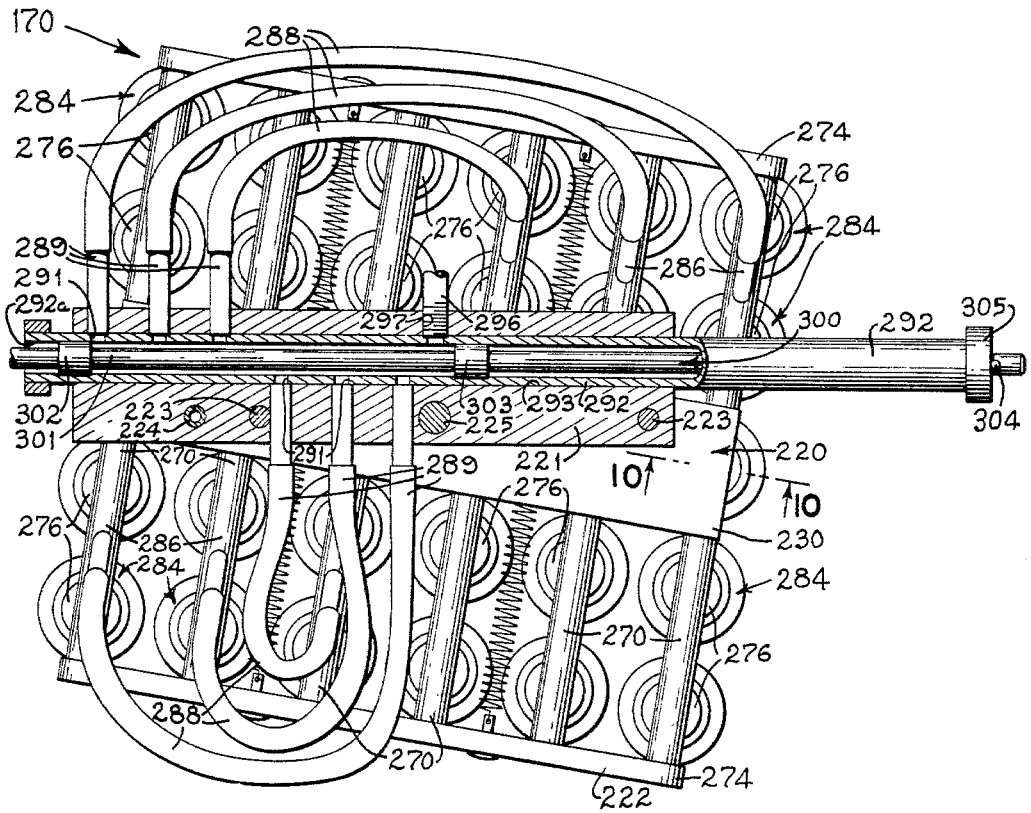
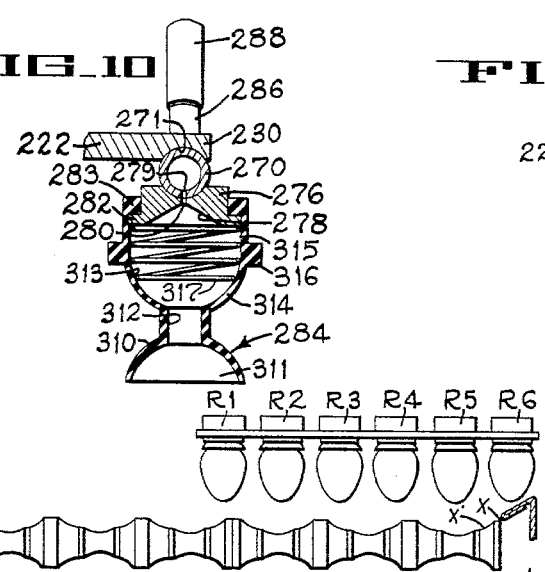
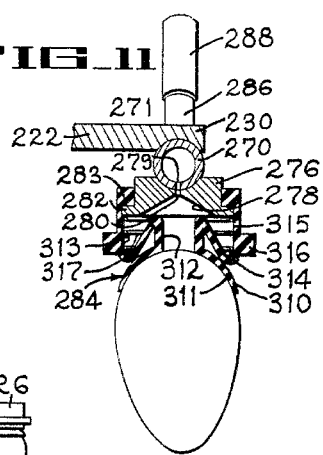

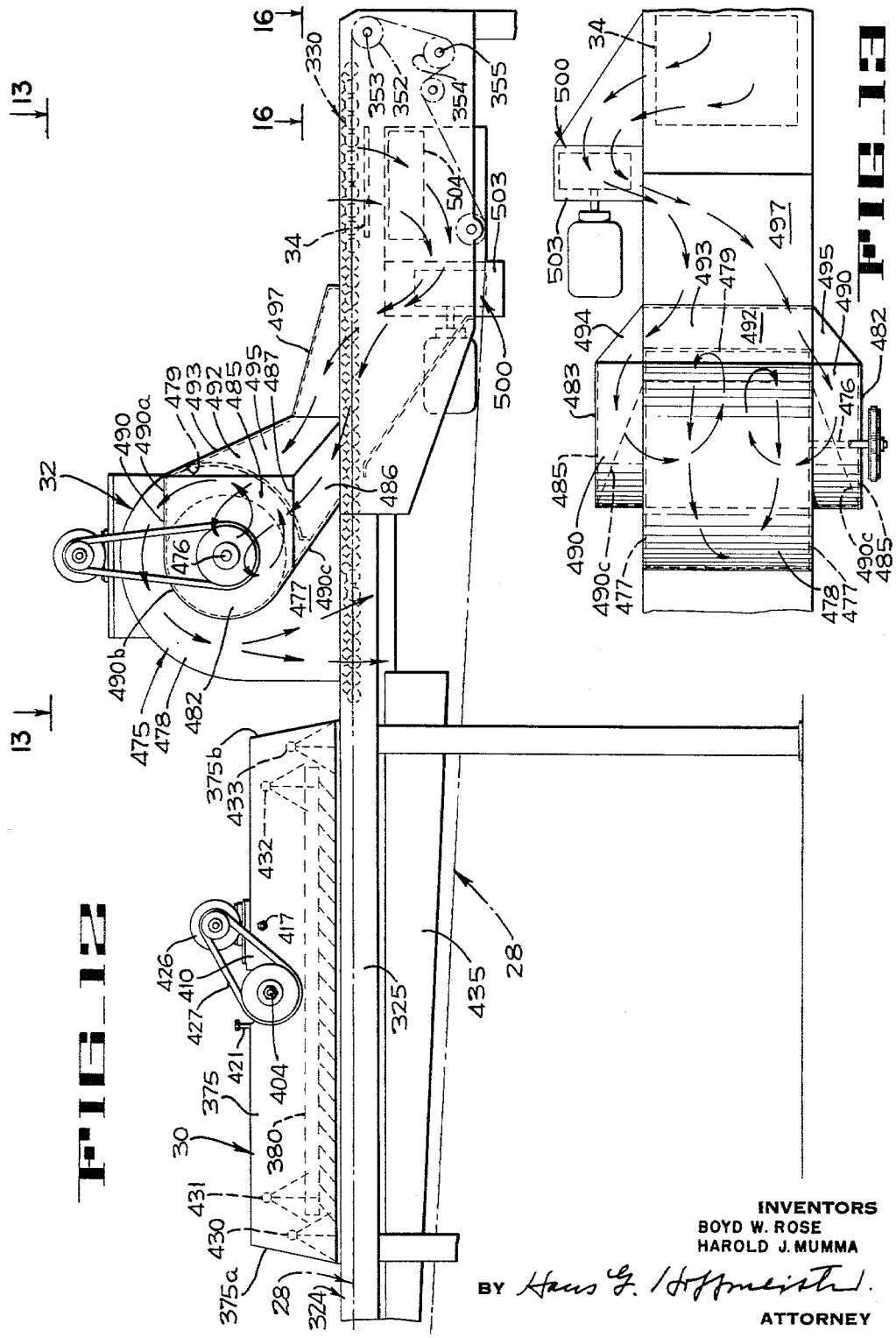

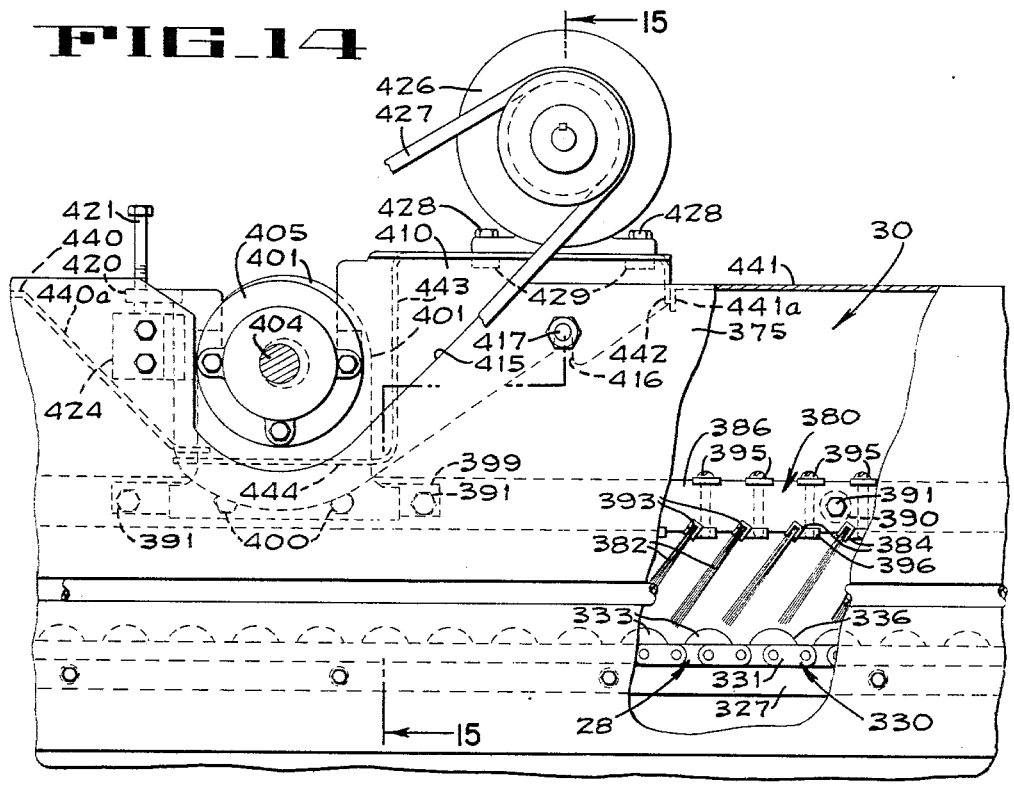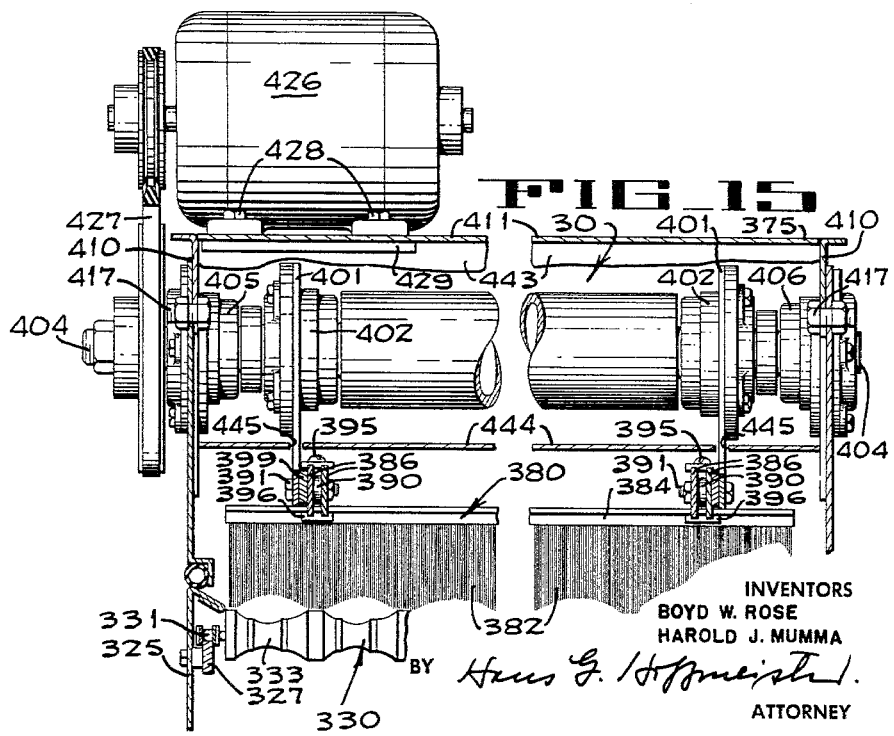

May 24, 1966  B. W. ROSE ETAL  3,252,607
MACHINE FOR HANDLING EGGS
Filed Sept. 28, 1962  11 Sheets-Sheet 8
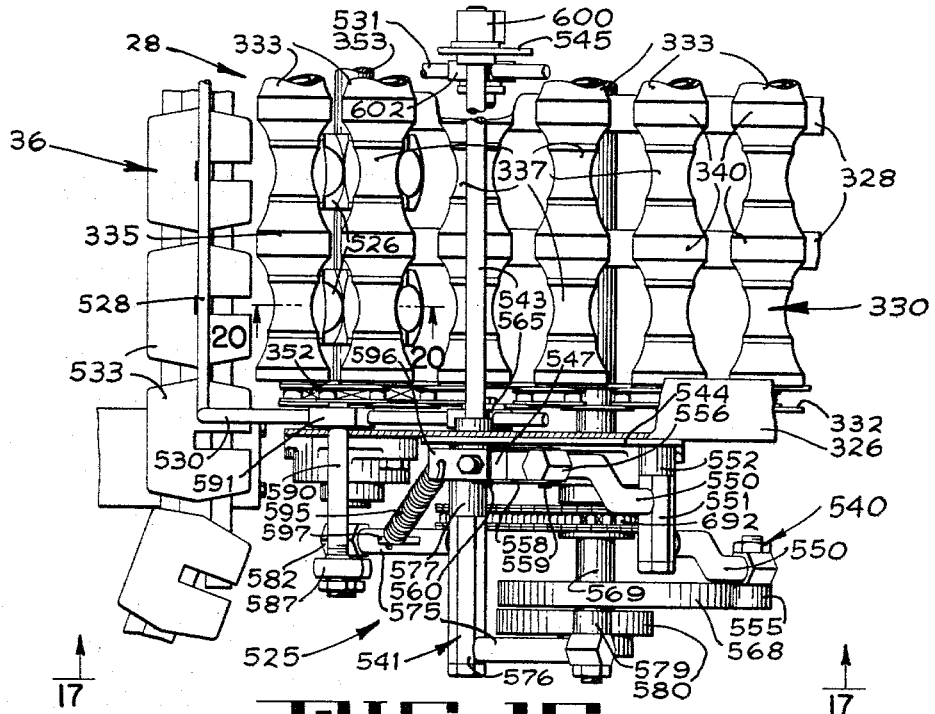
FIG_16
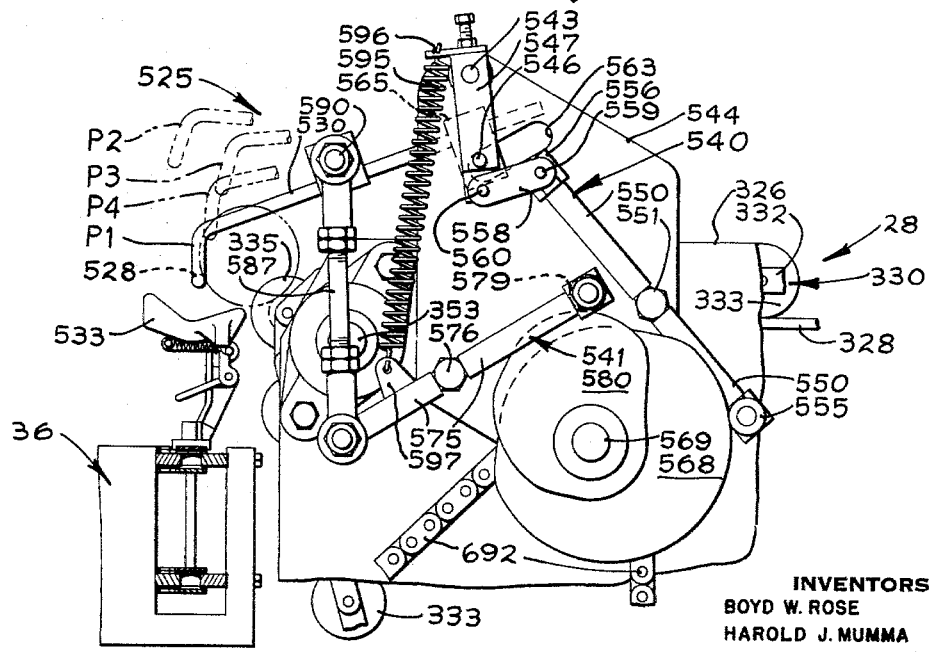
FIG_17
INVENTORS
BOYD W. ROSE
HAROLD J. MUMMA
BY Hans G. Hoffmeister
ATTORNEY

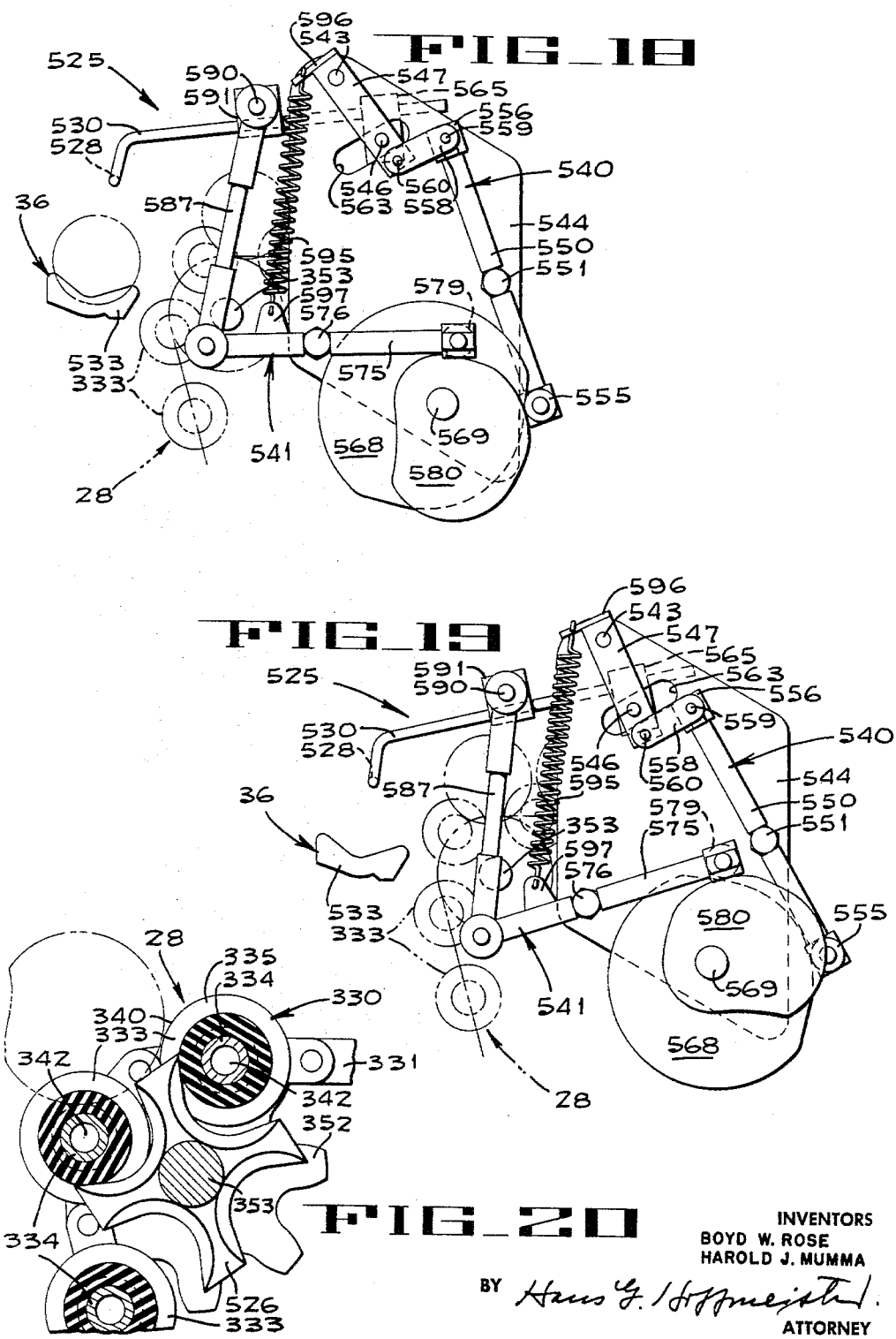

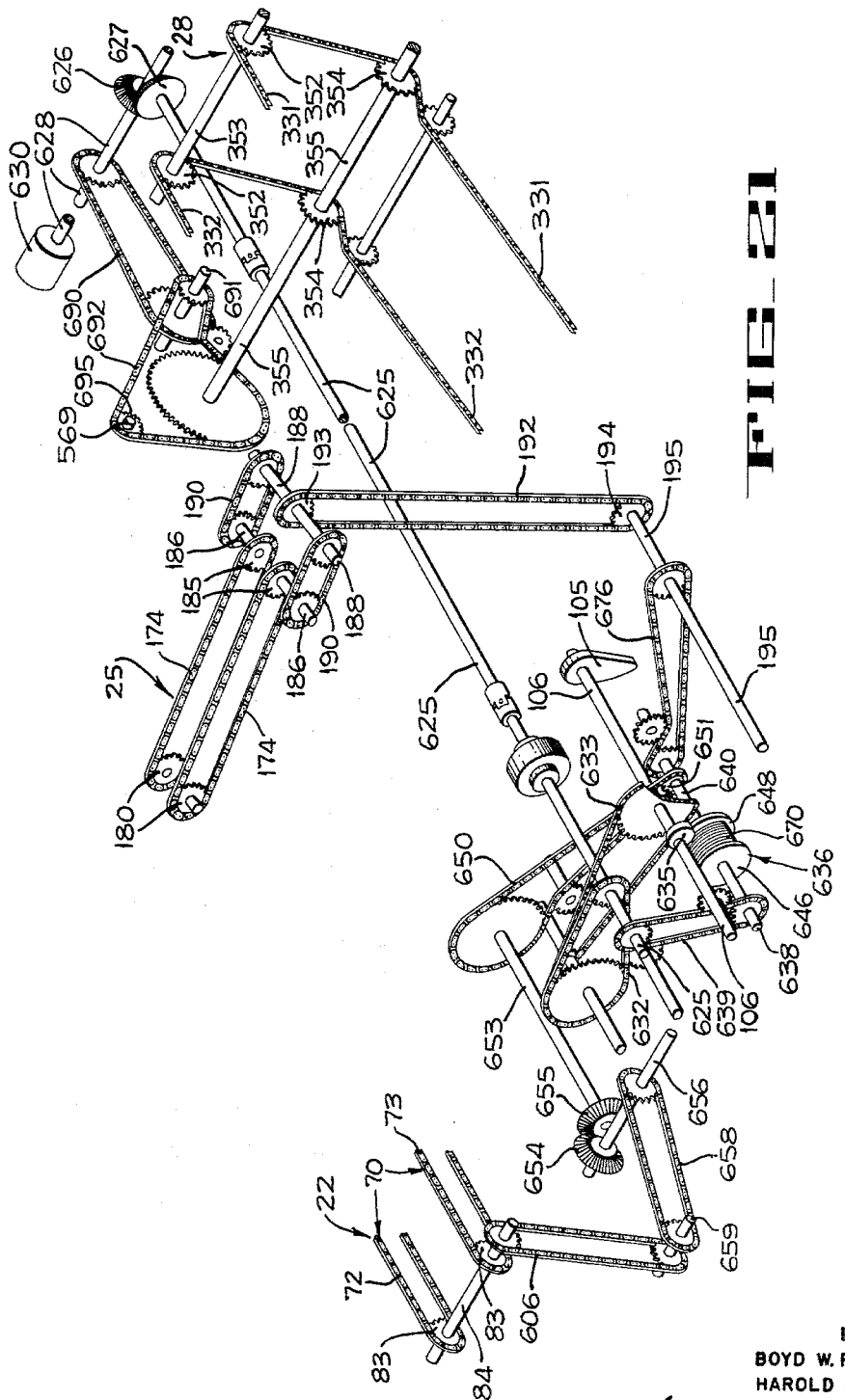

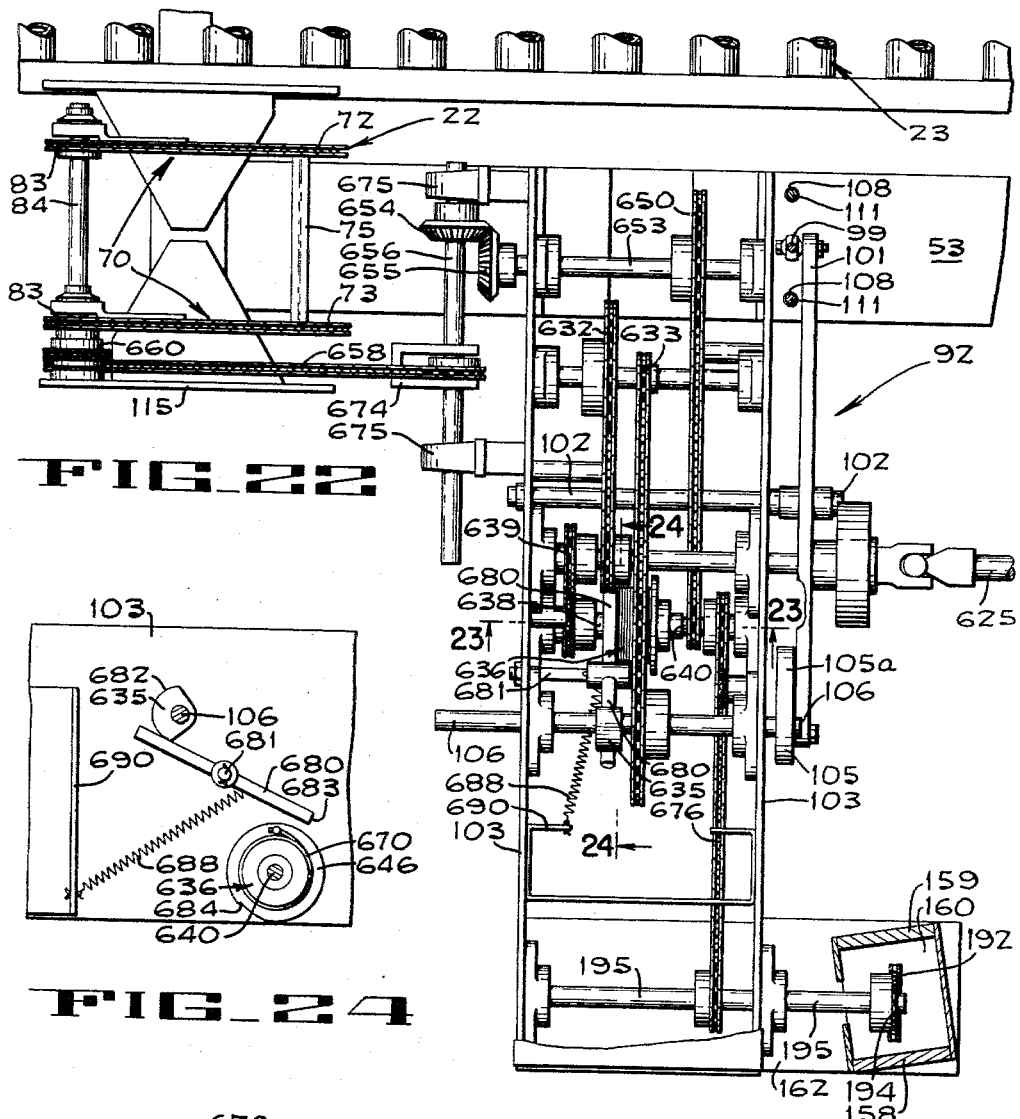
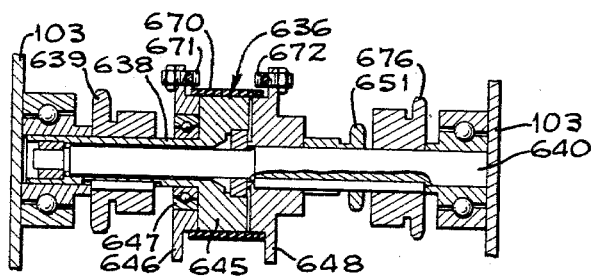

United States Patent Office 3,252,607
Patented May 24, 1966

3,252,607
MACHINE FOR HANDLING EGGS
Boyd W. Rose and Harold J. Mumma, Riverside, Calif., assignors to FMC Corporation, San Jose, Calif., a corporation of Delaware
Filed Sept. 28, 1962, Ser. No. 226,994
11 Claims. (Cl. 214—309)

This invention pertains to machines for handling elongate articles such as eggs, and more particularly concerns apparatus for feeding eggs into an automatic egg-processing machine.

When eggs are packaged for retail marketing they must be placed in the cartons so that the small end of each egg is facing downwardly in the pocket. To achieve this result, it is customary to require the egg producer to place the eggs small-end down in filler flats and pack the flats, without changing the orientation of the eggs, in field cases for transporting to the egg processing plant. At the plant, the filler flats are removed from the field cases, and the eggs are transferred into the machine by means of a manually-operated, vacuum egg-lifting device. In transferring the eggs from the filler flat to the machine, the operator tries to maintain the desired small-end-down orientation of the eggs and to so release the eggs that they are disposed in pockets of a processing conveyor with the small ends of all eggs facing in the same direction. However, the vacuum lifters presently being used are difficult to manipulate and, accordingly, it is necessary to provide an auxiliary egg orienting mechanism for assuring that all the eggs are properly aligned as they are fed into and move through the machine. It is therefore, an object of the present invention to provide a mechanism for automatically removing eggs from a filler flat and placing them in the cups of an egg processing conveyor with the small-ends of all eggs facing in the same direction.

Another object is to provide a novel arrangement of the various components of an egg processing machine so that an exceptionally compact machine is provided.

Another object is to provide an improved conveyor system for an egg handling machine.

Another object is to provide an efficient vacuum-type egg-pickup mechanism for an egg processing machine.

Another object is to provide an improved mechanism for transferring eggs from one conveyor to another.

Another object is to provide a mechanism for controlling the discharge of eggs over the end of an endless roller conveyor.

Another object is to provide an improved vacuum cup for picking up and releasing eggs.

Another object is to provide an improved drive mechanism for controlling the movements of the several components of an egg handling machine.

Another object is to provide an efficient egg washer.

Another object is to provide an improved egg drier for an egg-handling machine.

Other and further objects and advantages of the present invention will be apparent from the following description taken in connection with the accompanying drawings in which:

FIG. 1 is a diagrammatic plan of the egg processing machine of the present invention.

FIG. 2 is a diagrammatic side elevation of the filler flat feed conveyor, the view being taken as indicated by line 2—2 of FIG. 1.

FIG. 3 is an enlarged vertical section taken on line 3—3 of FIG. 2.

FIG. 4 is an enlarged vertical section taken on line 4—4 of FIG. 2.

FIG. 5 is an enlarged vertical section taken on line 5—5 of FIG. 1, with parts broken away.

FIG. 6 is an enlarged vertical section taken on line 6—6 of FIG. 5.

FIG. 7 is a plan looking down on the mechanism of FIG. 5 as indicated by arrows 7—7 of FIG. 5.

FIG. 8 is an enlarged vertical section taken on line 8—8 of FIG. 7.

FIG. 9 is an enlarged horizontal section taken on line 9—9 of FIG. 5.

FIG. 10 is an enlarged vertical section taken on line 10—10 of FIG. 9.

FIG. 11 is a section similar to FIG. 10, but showing a different operating position of an egg pickup cup.

FIG. 11A is a fragmentary diagram illustrating the discharge of eggs from the vacuum manifold.

FIG. 12 is a diagrammatic side elevation, the view being taken substantially as indicated by line 12—12 of FIG. 1.

FIG. 13 is a diagrammatic plan looking down on the mechanism of FIG. 12 as indicated by arrows 13—13 of FIG. 12.

FIG. 14 is an enlarged diagrammatic side elevation of a portion of the egg washer of FIG. 13, with parts broken away.

FIG. 15 is a vertical section taken along line 15—15 of FIG. 14.

FIG. 16 is an enlarged fragmentary plan of the discharge end of a roller conveyor used in the present machine, the view being taken as indicated by lines 16—16 of FIG. 12, and the conveyor being shown facing in the opposite direction from the direction it faces in FIG. 12 whereby the discharge end of the conveyor is shown at the left in FIG. 16 rather than at the right as in FIG. 12.

FIG. 17 is a diagrammatic side elevation, with parts in section, taken as indicated by line 17—17 of FIG. 16.

FIGS. 18 and 19 are side elevations similar to FIG. 17 but showing different operating positions of the egg discharge mechanism.

FIG. 20 is an enlarged vertical section taken on line 20—20 of FIG. 16.

FIG. 21 is a schematic showing of the drive train of the machine of the present invention.

FIG. 22 is an enlarged fragmentary diagrammatic plan, with parts broken and parts in section, taken as indicated by line 22—22 of FIG. 2.

FIG. 23 is an enlarged vertical section taken on line 23—23 of FIG. 22.

FIG. 24 is an enlarged vertical section taken on line 24—24 of FIG. 22.

The egg processing machine, which is shown in the accompanying drawings to disclose the various features of the present invention, is of the type adapted to receive eggs on filler flats which are manually removed from field cases received from the egg producer. During their movement through the machine the eggs are removed from the filler flats, washed, dried, candled, weighed and graded, and placed in cartons. In the diagrammatic showing of FIG. 1, the reference numeral 20 indicates a platform on which an operator O stands as he removes a filler flat F from a field case C resting on a roller conveyor 23 and places the flat on an endless chain conveyor 22, the upper run of which moves intermittently in the direction of arrow 24 to position the loaded flats, one by one, under one end of a transfer unit 25. The transfer unit 25, which is a particular feature of the present invention lifts the thirty eggs from the filler flat and moves them in the direction of arrow 26 to a position above an endless roller processing conveyor 28, the upper run of which moves in the direction of arrow 29. The transfer unit deposits the eggs on the conveyor 28 which carries them through a washer 30, a drier 32, and over a candling light 34 where they are inspected by a second operator O' standing on a platform 35. After sub-standard eggs are removed by the operator, the remaining eggs are discharged into individual cups of an endless chain transfer conveyor 36 which delivers the eggs into a weighing unit 37 comprising three scales, each of which is adapted to receive and weigh different eggs and deposit them on an endless chain bucket conveyor, indicated by a centerline 38. The upper run of conveyor 38 moves in the direction of arrow 39 and carries the eggs in single file past eight cartoning stations which are indicated by phantom lines S1–S8. At each station, a carton or filler flat is automatically removed from a supply hopper H, moved to the right (FIG. 1) and positioned under the upper run of the bucket conveyor 38 so that an egg, having the particular grade assigned to that station, can be discharged into the carton or flat. In FIG. 1, an arrangement is illustrated wherein stations S1–S3 are arranged to pack filler flats, and stations S4–S8 are arranged to handle cartons of the usual type adapted to receive a dozen eggs and store them in two rows with six eggs in each row. When the flats have been filled at stations S1–S3, they are moved by appropriate conveying means onto a flat apron 40 where they are within easy reach of an operator O'' who places the filled flats in shipping cases C' positioned on a flat platform 41. When a carton has been filled at any of the stations S4–S8, it is automatically moved onto an endless belt conveyor 42 which carries the carton through a closing unit 44 and moves it onto a rotating disc 45. The disc reverses the direction of movement of the carton, rotates it 90°, and deposits it on a second endless belt conveyor 46, in a position generally transverse to the belt, as indicated by carton C'', for conveyance in the direction of arrow 47 to a second apron 48 within reach of operator O''. When a shipping case C' has been filled, the operator slides the case to the end 41A of platform 41 and shifts it to a take-away conveyor 49.

The present invention is particularly concerned with the transfer unit 25, the roller conveyor 28, the washer 30 and the drier 32. The transfer conveyor 36, the weighing unit 37, the bucket conveyor 38, the mechanisms at the egg cartoning stations S1–S8, and the closing unit 44 may be of the type disclosed in the patents to Mumma, No. 2,895,274 and No. 2,909,880 and the application of Harold J. Mumma, Ser. No. 66,335 which is assigned to the assignee of the present application. Reference may be had to these patents and said application for a complete disclosure of such mechanisms.

The filler flat conveyor 22 comprises two spaced box-like support posts 50 and 51 (FIG. 2), which are interconnected by suitable longitudinal braces 52 and by a longitudinal channel 53. A transverse pivot shaft 54 (FIG. 3), which is square in cross-section, is supported in spaced relation above the upper end of post 51 by two spacer blocks 55 that are secured to a top plate 56 on post 51 and to the shaft 54 by means of bolts 57 extending through the top plate, the spacers and the shaft 54. At each end, the shaft 54 has a cylindrical portion 54a disposed in a bearing sleeve 58 that is carried by a vertical bracket 59, and each bracket is bolted to both a top guide rail 60 and a bottom guide rail 61. At each side of the conveyor, the bracket 59 cooperates with a plurality of auxiliary brackets 62 (FIG. 2) to hold the guide rails 60 and 61 in spaced relation so that a chain guide opening 63 is formed between the guide rails. The two upper guide rails 60 are also interconnected by a plurality of transverse spaced bars 64 which rigidify the conveyor support structure so that it will pivot as a unit about pivot shaft 54.

An endless conveyor chain 70, which has its upper run movable in the direction of arrow 71, is made up of two chain members 72 and 73 (FIG. 7) which are interconnected by a plurality of pusher bars 75 which have inclined forward and rearward faces. At one end of the conveyor support structure, each chain is trained around an idler sprocket 80 (FIG. 2) that is carried on a shaft 81 which is rotatably journalled at its end in extensions of the upper guide rail 60. At the other end of the structure, each chain is trained around a drive sprocket 83 which is keyed to a drive shaft 84 carried by the two guide rails 60. As best seen in FIGS. 2 and 5, the upper runs of the conveyor chain members 72 and 73 ride on the upper surfaces on the guide rails 60 while the lower runs are disposed in the guide opening 63 formed between the guide rails 60 and 61.

During operation of the machine, the filler flat conveyor 22 is periodically driven to position a flat of eggs under one end of the transfer unit 25 at an egg pick-up station, indicated by phantom line 90 (FIG. 2). When each flat of eggs is positioned at the pick-up station, the entire filler flat conveyor 22 is pivoted a short distance clockwise (FIG. 2) about pivot shaft 54 to raise the eggs toward the underside of the transfer mechanism. The raising and lowering of the conveyor 22 is carried out by means of a lift mechanism 92 (FIG. 4) which includes a shaft 93 of square cross-section that has cylindrical end portions 94 journalled in two brackets 96 which are secured at opposite sides of the conveyor to the upper and lower guide rails 60 and 61. A transverse plate 98 is bolted to the shaft 93, and a lift rod 99 is pivotally connected at 100 to the plate 98 and extends downwardly therefrom. At its lower end, the lift rod 99 is pivotally connected to a rocker arm 101 which is pivotally supported on a shaft 102 projecting from a rigid support housing 103. The housing 103 is part of the main support structure of the machine and is supported at one end on a support post 104 and, at the other end it is bolted to the inverted channel 53 extending between the two box-like posts 50 and 51 of the filler flat conveyor 22. At its free end, the rocker arm 101 carries a follower roller 101a which rides along the surface of a cam 105. The cam 105 is keyed to a control camshaft 106 which is journalled in the housing 103 and forms part of a drive train which will be explained more fully hereinafter. It will be noted that, as the shaft 106 is rotated, the rocker arm 101 is pivoted and the lift rod 99 is actuated to pivot the conveyor 22 (FIG. 2) about pivot shaft 54. Two counterbalance springs 108 assist the rocker arm 101 in lifting the end of the conveyor. As seen in FIG. 4, each spring is disposed between the channel 53 and a collar 110 that is adjustably secured on a rod 111, which is secured at its upper end to the square shaft 93 and is slidably journalled at its lower end in the channel 53. The springs 108 are so adjusted that they permit the conveyor to move down to its lower position when the follower roller 101a is on the low part of the surface of cam 105, but assist the rocker arm in raising the conveyor when the cam lobe 105a engages the follower 102a. It will be noted that the lower position of the conveyor 22 is determined by the abutment of a pair of side plates 115 (one only being shown) which are secured to the left end (FIG. 2) of the conveyor frame, with a plate extending across the upper end of post 50.

When the conveyor is raised, the filler flat at the pick-up station is gripped by a clamping mechanism which comprises a clamp plate 125 (FIG. 4), fixed to the lift bracket 96 at one side of the conveyor 22, and a movable clamp plate 126 that is secured to the upper end of a post 127 (FIG. 5). At its lower end, the post is secured, as by welding to a bent lever 130 that has a first arm 130a, journalled for pivotal movement in a fixed bracket 131, and a second arm 130b disposed at right angles to the first arm. A tension spring 133 is connected between the end of arm 130b and a clip 134 which is secured to the lift rod 99. When the conveyor 22 is moved downward to its lowered position, the arm 130b contacts the upper end of a fixed actuator rod 136 and, as a result, the lever 130 is pivoted clockwise (FIG. 4) to move the clamp plate 126 away from filler flats on the conveyor. It will be evident that, when the conveyor is raised, the arm 130b will move away from actuator rod 136 and the spring 133 will swing the clamp plate 126 inwardly to a position in which its inwardly bent upper edge portion overlies the edge of a filler flat at the pickup station. The upper edge of the stationary clamp plate 125 is also bent inwardly to overlie the edge of the filler flat. Accordingly, after the eggs have been removed from the flat by the transfer unit 25 and the conveyor is lowered, the clamp plates 125 and 126 positively move the empty flat downwardly with the conveyor. Therefore, if a filler flat should, for some reason, adhere to an egg and tend to be lifted off the filler flat conveyor, it will be positively stripped therefrom by the clamp mechanism.

After the eggs have been removed from each filler flat, the empty flat will be conveyed to the end of the conveyor 22 where it can be discharged over the end or collected by any suitable mechanism.

The egg transfer mechanism 25 comprises a rigid frame 150 (FIG. 5), which includes two side plates 151 and 152 and an end plate 153 all rigidly secured together. At its left hand end (FIG. 5), the frame is supported as a cantilever from a support column comprising two vertical plates 158 and 159 which are, at their lower end, secured by capscrews to a rigid plate 160 (FIG. 7) that forms the base of the column. The base plate 160 is, in turn, bolted to a fixed, rigid plate 162 projecting outwardly from the support housing 103. As seen in FIG. 7, the frame 150 of the transfer mechanism is not at right angles to the roller conveyor 28 or the flats conveyor 22 but is inclined at an angle relative thereto so that eggs can be transferred from the transfer unit 25 to the roller conveyor 28 while both members are moving.

A pickup mechanism in the form of a vacuum head 170 (FIGS. 5 and 7) is reciprocated back and forth along the frame 150 by means of an actuator rod 171 which has a threaded end locked in a transverse bar 172. Each end of the bar 172 is provided with a recess which receives a pin 173 projecting from a special link of one of two endless chains 174. Each chain 174 is trained around an idler sprocket 180 that is rotatably journalled on a cap-screw 181 secured to and projecting from a side plate of the frame 150. Each chain is also trained around a drive sprocket 185 that is keyed to a shaft 186 which is journalled for rotation in suitable bearings 187 in the associated side plate of the frame. Both of the two shafts 186 are driven by a common drive shaft 188 through identical chain and sprocket drives 190 and the drive shaft 188 is, in turn, driven by a chain 192 which is trained around a sprocket 193 keyed to shaft 188 and a sprocket 194 keyed to a shaft 195. The shaft 195 is part of a drive train that will be described presently. During operation of the machine, the shaft 195 is driven at intervals and, while it is rotating, it causes the chains 174 to travel in an endless and reciprocate the actuator rod 171 back and forth across the frame 150. During their movement in the frame, the chains are supported on vertical guide bars 197 and 198 (FIG. 5) that are mounted in fixed position in the frame.

At its free end, the actuator rod 171 carries a yoke 200 which has arms 201 (FIG. 7) that are disposed on opposite sides of and pivotally connected by a pin 202 to a post 203 (FIGS. 7 and 8) projecting upwardly from a plate 204 that is secured to a carriage 205. The carriage 205 has grooves 206 and 207 (FIG. 8) in its opposite side edges which receive stationary support tracks 208 and 209 that project inwardly from the under surface of the side plates of the frame 150. It will be evident that, as the actuator rod 171 moves back and fourth in the frame, it causes the carriage 205 to slide back and forth along the open bottom end of the frame on the tracks 208 and 209.

An egg pickup head 220 is mounted immediately below the carriage 205, said head comprising a valve body 221 and a vacuum manifold 222. The valve body is secured by capscrews 223 (FIG. 9) to the carriage 205, however, the manifold 222 is movable vertically relative to the carriage, being carried by a rod 225 (FIGS. 5 and 6) that is slidably received in the valve body and in a bushing 226 disposed in the carriage. At its lower end the rod 225 is threaded into a manifold support plate 230 that extends across the manifold and, at its upper end, the rod 225 is threaded into a yoke 231 which has a slanted lower end face 232. The arms 201 of the yoke 200 engage the face 232 to support the yoke 231, the rod 225 and the manifold secured to the lower end of the rod. A roll pin 224 (FIG. 9) which is carried by the valve body, extends downwardly therefrom and is slidably received in an opening in the manifold plate 230 to prevent rotation of the manifold during its vertical movement.

In FIG. 5 the actuator rod 171 is shown at the end of its travel toward the right. Accordingly, the rod is in a substantially horizontal position and a roller 240 at the upper end of the yoke 231 rests on a cam rod 241 that is secured on the upper side of the frame 150 and has inclined camming surfaces 241a and 241b. When the chains 174 are actuated, they move counterclockwise around the idler sprockets 180, as indicated by arrow 242, and the actuator rod 171 is pivoted clockwise about pin 202 causing the arms 201 of yoke 200 to swing downwardly out of engagement with the yoke 231. Therefore, as the carriage 205 moves toward the left, the vacuum manifold 222 is supported by the cam rod 241. It will be seen in FIG. 6 that the manifold 222 moves with the carriage 205 due to the positioning of the rod 225 in the bushing 226 of the carriage.

When the actuator rod 171 reaches the end of its travel at the left end of the frame 150 and the transverse bar 172, to which the rod is connected, moves counterclockwise around the shaft 186, the rod is pivoted counterclockwise about pin 202, causing the arms 201 of yoke 200 to swing upwardly to engage the yoke 231 to raise the roller 240 off the cam rod 241. Accordingly, when the carriage is subsequently moved to the right (FIG. 5) to its home position above the flats feeding conveyor 22, the vacuum manifold 222 is carried in an elevated position with the roller 240 spaced slightly above the cam rod 241.

The vacuum manifold 222 comprises six tubes 270 (FIG. 9) that extend transversely below the manifold support plate 230, and as seen in FIG. 10, each tube is soldered in a groove 271 in the under surface of the plate. All of the tubes 270 are of the same length, and the two sets of six adjacent ends of the tubes are closed by two covers 274 (FIG. 9) which fit tight against the end surfaces of the tubes. Each tube carries five equally spaced cup-support members 276, each member being soldered to the underside of the tube and having a frusto-conical recess 278 (FIG. 10) communicating with the interior of the tube through aligned passages 279 and 280 that are approximately .054" in diameter. An annular lip 282 is formed on the lower end of each cup-support member 276 so that an annular flange 283 of a molded rubber vacuum cup 284 can be snapped over the lip and supported thereby in air tight engagement with the cup support member. Each tube 270 has an opening in its upper surface to receive a short conduit 286 which is soldered therein. As seen in FIG. 9, a rubber hose 288 connects the short conduit 286 of each manifold tube to a conduit 289, that is disposed in an opening in the valve body 221 and communicates through a port 291 with the interior of a distribution tube 292 pressed in a longitudinal opening 293 in the valve body. A nipple 296 which is threaded through a tapped opening 297 in the valve body establishes communication between the interior of the tube 292 and a vacuum pump (not shown) which may be of any suitable commercial type. To control the vacuumizing of the six manifold tubes 270, a valve 300 is disposed in the distribution tube 292 in the form of a rod 301 having two spaced collars 302 and 303 welded thereon. The collars not only act as valve members, in that they are arranged to open and close the ports 291, but they also form an air-tight chamber since they are in close, substantially air-tight slidable engagement with the interior wall of the tube 292. It will be noted in FIG. 5 that when the vacuum carriage is disposed above the filler flat conveyor 22, the valve rod engages a stop 306 adjustably carried by a bracket 307 secured to the frame member 153. When the carriage moves toward the left (FIG. 5) the rod engages a stop pin 308 adjustably secured in the column member 159.

In the position shown in FIG. 9, the valve rod has been moved to the left by contact with stop 306 until a pin 304 carried by the rod 301 abuts a collar 305 secured to the tube 292. In this position of the valve rod, all the manifold tubes have been connected to the source of vacuum since the six ports 291 and the nipple 296 are between the valve collars 302 and 303. It will be apparent that, when the valve rod is moved toward the right (FIG. 9) and engages stop 308, the collar 302 will break the connection of the six manifold tubes 270 one after the other, by first closing the associated port 291 and then venting the tube to atmosphere through the open left end 292a of the distribution tube 292.

The vacuum cup 284 is provided with a lower, egg-contacting, fragmentary spherical portion 310 which provides a chamber 311 communicating through a tubular neck 312 with a main chamber 313 defined by a fragmentary spherical wall 314 and a generally cylindrical wall 315. A relatively light coil spring 317 is disposed within chamber 313 with its upper end abutting the cup-supporting member 276 and its lower end abutting the inner wall of the cup. At its upper end the cylindrical wall 315 has the above-mentioned annular flange 283 formed integrally therewith and, near its lower end, the wall is enclosed by a reinforcing annular rib 316. As seen in FIG. 11 when the main chamber is connected to the source of vacuum, the upper spherical wall 314 collapses and moves upwardly to a position inwardly of the cylindrical wall 315, the reinforcing rib 316 being effective to prevent the sidewise movement of the collapsing cup during upward movement. While the vacuum is being released from the cup and at a time when the cup is still gripping the egg, the spring 317 moves the lower end of the cup downwardly. Thus, the egg is not abruptly dropped out of the cup as would occur if the vacuum were suddenly released; rather, due to the action of the sliding valve rod the vacuum is released gradually and the spring acts during the gradual release of vacuum to expand the cup and lower the egg to the roller conveyor 28.

The roller conveyor 28, which receives eggs from the transfer unit 25, is best shown in FIGS. 5, 7 and 12 and comprises a support structure 324 which includes a pair of fixed side plates 325 and 326 (FIG. 5), a pair of fixed longitudinally extending chain tracks 327, and three fixed roller support tracks 328. A roller chain 330, which is mounted in the frame, includes a pair of chains 331 and 332, the upper runs of which roll along the tracks 327. A plurality of rollers 333 are disposed between the chains, each roller including a rigid metallic central tube 334 and two rubber rolls 335 and 336 that are disposed in end-to-end relation on the tube 334. Each roll has three identical sections 337 which have hour glass configurations so that each section 337 cooperates with similar sections on the immediately adjacent rollers 333 to form pockets or cups into which the eggs are deposited by the transfer head. Cylindrical sections 340 are formed at the ends of the sections 337 and certain of these cylindrical sections ride along the tracks 328, causing the rollers in the upper run of the conveyor to rotate as they move along. It will be noted in FIG. 7 that each open end of the central tube 334 of each roller 333 receives a cylindrical pin 342 projecting inwardly from a special link in adjacent chain 331 or 332 so that the roller 333 moves with the chain and is capable of rotating as it moves along.

The roller chain 330 is trained around idler sprockets 348 (one only being shown) disposed on a shaft 350 (FIG. 7) that is journalled for rotation at one end of the support structure in the side plates 325 and 326. The upper run of the chain travels through the washer 30 (FIG. 12), the drier 32, and over the candling light 34 and, at its downstream end it is trained around idler sprockets 352 (FIG. 21) disposed on a shaft 353. The lower run of the chain is trained over a pair of drive sprockets 354 and over suitable idler sprockets. The shaft 355 which drives the sprockets 354 and the conveyor chain is part of a drive train that will be described presently.

The washer 30 comprises a sheet metal housing 375 (FIG. 12) which has an opening (not shown) at its forward end 375a adapted to permit the entry of the upper run of the roller conveyor 28, and a similar opening (not shown) at its rearward end 375b through which the conveyor 28 passes. A brush assembly 380 is mounted in the housing 375 for movement in an orbital path such that the lower ends of the bristles of the brushes move downwardly to engage and wipe across the eggs on the rollers and then are moved upwardly away from the eggs.

The brush assembly comprises a plurality of bristle units 382 (FIG. 14) each of which includes an elongate channel shaped holder 384 that is clamped in a carrier mechanism comprising two pair of spaced elongate support bars 386 (FIG. 15). Each pair of bars 386 is held in spaced relation by a plurality of spacers 390 and bolts 391 locking the bars on the spacers. Each channel shaped bristle holder 384 fits into a pair of identical recesses 393 (one only being shown) in the lower edges of the bars 386 and a bolt 395, which extends down between the adjacent bars 386, engages a special nut 396 and draws it up against the channel to lock the channel in place.

Each pair of the two pairs of elongate support bars 386 is secured by certain of the bolts 391 to a short bar 399 (FIG. 14) which in turn is secured by bolts 400 to the lower end of an actuator plate 401. Near its upper end each plate 401 is bolted to a bearing 402 that receives the eccentric throw of a shaft 404, the concentric portion of which is journalled for rotation in bearing units 405 and 406. Each of the bearing units 405 and 406 is bolted to a support plate 410, and the upper ends of the two support plates are connected by a transverse plate 411. Each plate 410 is positioned adjacent a cut-out portion 415 in one of the two side walls of the washer housing, and each plate has a notch 416 formed near its right hand end (FIG. 14) to receive the shank of a bolt 417 therein. A tab 420 is secured to the left hand end of each plate 410 and an adjusting screw 421, that is threaded through the tab, bears against an abutment plate 424 secured to the inner face of the adjacent side wall of the housing. When the bolts 417 are tightened up, the two plates 410 are locked to the housing. If it is necessary to adjust the height of the brushes, the bolts 417 are loosened and the adjusting screws 421 are actuated to pivot the plates 410 and the brush unit supported thereby about an axis defined by the two aligned bolts 417. The drive shaft 404 is driven by a motor 426 by a belt and pulley drive mechanism 427. The motor is secured by capscrews 428 to the transverse plate 411 and to a pair of stiffening bars 429 disposed beneath plate 411.

As the eggs enter the washer they receive a pre-soaking spray of fresh water containing a wetting agent by means of a transverse spray pipe 430 (FIG. 12). After the pre-soak, the eggs progress into the washing section where sprays from transverse spray pipes 431 and 432 and the orbital brushes combine to remove surface dirt from the eggs. As the eggs leave the brushing area they receive a momentary hot water rinse by means of a spray pipe 433. The several spray pipes are connected to conventional sources of pressurized hot or cold water as desired, and a trough 435 is provided below the washer to direct the wash water to a suitable drain.

A feature of the present invention is the arrangement of the upper wall of the housing so that the drive shaft 404 and the bearings in which it is journalled are completely isolated from the water vapor rising from the washer. As a result, the bearings have an exceptionally long life for bearings of an egg washer installation. It will be noted in FIG. 14 that the cover of the housing 375 is made in two sections; a forward section 440 which terminates in an inclined section 440a and a rearward section 441 that terminates in a depending flange 441a. In accordance with the present invention, the plate 411 on which motor 426 is mounted is provided with a rearward depending flange 442 that abuts the flange 441a and is provided with a forward vertical flange 443 which has a generally horizontal forwardly extending portion 444 that underlies the drive shaft 404 and the rearward edge of the forward cover section 440a. Slots 445 (FIG. 15) are provided in the horizontal cover portion 444 to permit the orbital movement of the actuator plates 401 of the eccentric drive mechanism. It, therefore, is apparent that the drive unit is cutoff from the moist interior of the washer.

The drier 32 comprises a blower 475 (FIG. 12) having a rotatable impeller (not shown) keyed to a shaft 476 that is journalled in suitable bearings in the opposite side walls 477 (FIG. 13A) of a main blower housing 478 which has the usual volute configuration so that air entering axially into the impeller will be forced against the forward curved wall portion 479 (FIG. 12) and will be directed rearwardly and downwardly and be discharged downwardly across the upper run of the roller conveyor 28. Air is directed axially into the impeller through two ducts 482 and 483 which enclose opposite ends of the impeller. The ducts 482 and 483 are identical but oppositely disposed, and each duct is a box-like sheet metal member having a side wall 485, a bottom wall 486 that joins the side wall 485 at line 487 and slants downwardly and inwardly to a point near the lower edge of the adjacent side wall 477 of the main blower housing. The top wall 490 of each duct is formed by a sheet metal member having a horizontal portion 490a, a curved rear portion 490b and a generally triangular piece 490c that fits between the wall 477 of the main housing and the inwardly and forwardly slanted rear edge of the bottom wall 486. Both of the ducts 482 and 483 open into a chamber 492 formed by a slanted forward wall 493 and two identical side walls 494 and 495. Air is drawn into the chamber 492 from a hood 497 that has an open bottom which overlies the roller conveyor 28 and an open rear end that communicates with chamber 492.

Air is forced upwardly into the hood 497 by an auxiliary blower 500 which is mounted in a sheet metal housing 503 that has an inlet opening 504 (FIG. 12) communicating with a chamber formed by sheet metal housing members below the candling light 34. When the auxiliary blower is in operation air is drawn downwardly over the candling light to cool the light and, at the same time, heat the air. It is then drawn laterally into the blower housing 503 as indicated by the flow arrows in FIGS. 12 and 13, and is forced by the impeller back inwardly under the roller conveyor 28 and upwardly into the hood 497. The air then moves into chamber 492 and then separates so that separate portions of air enter the impeller of the main blower from both sides and is forced upwardly, rearwardly and then downwardly over the wet eggs that have just been carried out of the washer on the roller conveyor 28. It will be particularly noted in FIG. 12 that the air makes three passes over the eggs on the roller conveyor and that, during the second and third passes, the air is warm and therefore capable of exerting an increased drying effect on the eggs.

While the complete structural details of the drier are not shown in the diagrammatic showings of FIGS. 12 and 13, it will be evident that the blower housings and air conduits are made of sheet metal members in the usual manner and are so arranged as to provide the necessary closed conduit system for guiding air along the path described above. The blowers are well known commercial units driven by suitable motors.

After the eggs are candled, they are moved to the discharge end of the roller conveyor and are discharged therefrom under control of a cam-actuated release mechanism 525 (FIGS. 16–19). As seen in FIGS. 16 and 20, a plurality of four-armed star wheels 526 are secured to the shaft 353 of conveyor 28, one star wheel being in alignment with each longitudinal row of pockets on the roller conveyor 28. The star wheels are so arranged on the shaft 353 that each arm moves up into a pocket to lift the egg out of the pocket. As the eggs drop out of the pocket, their fall is arrested by a bar 528 (FIG. 16) which extends across the discharge end of the conveyor and has a pair of rearwardly extending arms 530 and 531. In FIG. 17, four typical positions of the bar 528 are indicated. P1 indicates approximately the position the bar assumed just before eggs are discharged from the conveyor. It remains in this position until an egg from each of the six pockets has been deposited therein. Then it swings slightly forwardly and upwardly to position P2, releasing the eggs so that they drop simultaneously into six cups 533 of the transfer conveyor 36 which delivers the eggs to the weighing unit 37. The bar 528 then moves rearwardly to position P3, then downwardly to position P4, and finally returns to position P1 to receive the next group of six eggs. While the above-described path of movement of bar 528 is effective in releasing the six eggs simultaneously, other paths may be used, it being necessary only that the bar moves forwardly and then upwardly rather abruptly to clear the eggs.

Since the eggs on roller conveyor 28 are of different sizes, it is possible that, in any group of six eggs that reach the end of the conveyor abreast, some will be large and some will be small. Accordingly, when the star wheels engage the eggs and lift them out of their pockets, the large and jumbo eggs will tend to roll off the conveyor first and drop toward the cups of the transfer conveyor 36. Since the cups of the transfer conveyor are in stationary position below the bar 528 for only a very short time, it is desirable that all of the six eggs be discharged simultaneously at a predetermined time. The release mechanism of the present invention causes the bar 528 to remain in position until all six eggs have been discharged from conveyor 28. Then the bar is quickly lifted, and the eggs drop as a unit onto the cups of the transfer conveyor.

The orbital movement of the bar 528 is effected by two linkages 540 and 541 (FIG. 17) which are both mounted on the same side of the roller conveyor 28 at its discharge end. In general, linkage 540 causes the bar 528 to swing back and forth in a generally horizontal direction about the axis of a transverse shaft 543 journalled between two identical upstanding fixed support plates 544 and 545 on opposite sides of the conveyor, while linkage 541 swings the bar 528 upon and down about the axis of a short shaft 546 that is mounted in the lower end of a control lever 547 in a manner to be described presently.

The linkage 540 includes a lever 550 (FIGS. 16 and 17) which is pivoted on a bolt 551 that is threaded into a block 552 (FIG. 16) secured to the support plate 544. At one end, the lever 550 carries a roller follower 555 and, at the other end, it is provided with a hexagonal head 556 to which two flat bars 558 are pivotally connected by pin 559. The bars 558 are also pivoted by pin 560 to the lower end of the control lever 547 which is secured to the transverse shaft 543. The short shaft 546 is secured in the lever 547 and projects laterally therefrom through an opening 563 in the support plate 544. On the opposite side of plate 544, the shaft 546 is pivotally secured in a block 565 that is fixed on the arm 530 of bar 528. The roller follower 555 on lever 550 rides along the surface of a cam 568 that is keyed to a shaft 569 which is journalled in the side plates of the conveyor 28. The cam rotates counterclockwise (FIG. 17) causing the lever 550 to oscillate about bolt 551 whereby the control lever 547 is oscillated about the axis of shaft 543.

The second linkage 541 comprises a lever 575 which is pivoted on a bolt 576 that is threaded into a block 577 secured to the support plate 544. At one end, the lever 575 carries a roller follower 579 which rides on the peripheral surface of a cam 580 and, at the other end the lever is provided with a hexagonal head 582. The head 582 is pivoted to the lower end of a rigid link 587, the upper end of which is pivoted to a horizontal rod 590 (FIG. 16) that is disposed in a block 591 keyed to the arm 530 of bar 528. As the cam 580 is rotated counterclockwise, the lever 575 is oscillated about bolt 576, causing the arm 530 to swing up and down about the axis of the shaft 546. A spring 595 is stretched between a tab 596 on control lever 547 and a tab 597 on lever 575, the spring being arranged to pivot said levers in a direction to hold the cam roller followers 555 and 579 on their associated camming surfaces.

The two above-described cam actuated linkages 540 and 541, which coact to move the bar 528 through its orbital path are, as mentioned above, mounted on the support plate 544 at one side of the conveyor 28. These parts are not duplicated on the opposite side, it being necessary only to provide a control lever 600 (FIG. 16) which is substantially identical to control lever 547, being secured to the transverse shaft 543 so that it will pivot simultaneously with control lever 547 and having a short shaft (not shown) similar to shaft 546 and extending through a slot in support plate 545 to pivotally receive a block 602 that is keyed to the arm 531 of bar 528. With this arrangement, the control lever 600 will provide support for one end of bar 528 and will permit it to follow the movement dictated by the cam-actuated linkages 540 and 541.

The drive train for the several above-described mechanisms is shown diagrammatically in FIGURE 21. It will be remembered that the filler flat conveyor 22 and the vacuum cup carriage 205 of the transfer unit 25 are driven intermittently while the roller conveyor 28 is driven continuously. Also, the drive arrangement is such that the vacuum cup carriage is held stationary at its home position above a flat of eggs disposed on the filler flat conveyor 22, which is also stationary and, while these members are stationary, the conveyor 22 is pivoted upwardly to raise the eggs into engagement with the vacuum cups on the carriage. When the eggs have been gripped, the conveyor 22 is lowered, and then the vacuum carriage and the conveyor 22 are actuated, the carriage being effective to move the eggs to a position above the moving roller conveyor 28, discharge them, and return to its home position, and the filler flat conveyor being effective to move the empty flat away from the pickup position under the vacuum carriage and move a filled flat of eggs to said pickup position.

The drive train comprises a main shaft 625 (FIG. 21) which is driven through bevel gears 626 and 627 by a drive shaft 628. A main drive motor 630, which is operatively connected in driving engagement with said shaft 628, may, if desired, be connected to other mechanisms such as the transfer conveyor 36 and the bucket conveyor 38. The main shaft 625 drives the camshaft 106 through speed reducing sprocket and chain drives 632 and 633. The cam 105 which controls the raising and lowering of the filler flat conveyor 22 is, as previously mentioned, keyed to camshaft 106 as is a cam 635 which controls the engagement and disengagement of a clutch 636. The clutch has an input shaft 638, which is continuously driven by the main shaft 625 through a sprocket and chain drive 639, and an output shaft 640 which is intermittently connected to the continuously rotating input shaft to drive the filler flat conveyor 22 and the vacuum carriage.

The clutch 636 (FIG. 23) also includes a drum 645 formed on the input shaft 638, a control disk 646 journalled on a bearing 647 disposed around shaft 638, and a driven disk 648 which is keyed to the output shaft 640. The output shaft 640 drives the filler flat conveyor 22 through a sprocket and chain unit 650 (FIG. 21) which includes a sprocket 651 on shaft 640, a shaft 653, bevel gears 654, 655, a rotatable shaft 656 that is mounted in fixed bearings, a sprocket and chain drive 658, an idler shaft 659, and a sprocket and chain drive 660 that is drivingly connected to the drive shaft 84 of the conveyor 22.

A coil spring 670 (FIG. 23), which is disposed around the drum 645, is of square cross-section and has one end anchored by a retainer 671 in control disk 646 and an opposite end anchored by a retainer 672 in the driven disk 648.

Referring to FIG. 2 it will be noted that the idler shaft 659 is supported by two rigid arms 673 and 674, the arm 673 being pivotally connected to the conveyor drive shaft 84 and to the idler shaft 659, and the arm 674 being pivotally connected to idler shaft 659 and to the shaft 656 which is mounted in fixedly mounted bearings 675. With this arrangement the pivotal movement of the arms 673 and 674 permits the flat conveyor 22 to be raised and lowered without interfering with the ability of the drive mechanism to drive the conveyor.

The drive shaft 188 (FIG. 21) of the vacuum carriage is driven from the clutch output shaft 640 by the chain 192, the shaft 195, and a sprocket and chain drive mechanism 676 connecting shaft 195 to the clutch output shaft 640.

The cam 635 (FIG. 24), which controls the engagement of the clutch 636, has a camming surface against which one edge of a lever 680 rests. The lever 680 is pivotally mounted on a stub shaft 681 (FIG. 22) projecting inwardly from a side wall of the fixed support housing 103. The cam 635 has a lobe 682 that is so arranged that it pivots the lever 680 counterclockwise (FIG. 24) to move an end surface 683 out of the path of movement of an abutment surface 684 formed on the control disk 646. A spring 688, connected between the lever 680 and a fixed bracket 690, urges the lever toward a position against the surface of the disk 646. When the lever 680 is not in engagement with the control disk 646, the coil spring 670 assumes a position in frictional engagement with the periphery of the drum 645 so that the drum rotates the spring 670 and the driven disk 648 connected thereto. When the end of the lever 680 is cammed into the path of movement of the abutment surface 684 on the control disk 646 and is engaged thereby, the spring 670 is uncoiled or opened up, causing its inner surface to move out of frictional engagement with the drum 645 and discontinuing the rotation of the output shaft 640 of the clutch. The arrangement is such that, for each revolution of the camshaft 106, the spring 670 is held uncoiled for approximately three-tenths of the time and is permitted to frictionally grip the drum for the remainder of the time.

It should be noted that the two cams 635 and 105 on the camshaft 106 are coordinated so that the cam 105 lifts the flats conveyor 22 while the cam 635 disengages the clutch. Thus, the vacuum carriage and the filler flat conveyor are not driven during the interval during which the filler flat conveyor is elevated and lowered.

The drive shaft 355 (FIG. 21) of the roller conveyor 28 is driven from the drive shaft 628 through a sprocket and chain unit 690 connected between shaft 628 and an idler shaft 691, and a sprocket and chain unit 692 connected between the shaft 691 and the drive shaft 355 of the roller conveyor 28.

The chain of unit 692 is also trained around a sprocket 695 which is keyed to the camshaft 569 (FIG. 17) that controls the movement of the cam-actuated egg discharge mechanism.

When the machine is in operation, the operator O places filled flats of eggs on the conveyor 22 which is intermittently indexed to position the flats one-by-one under the vacuum manifold 222 (FIG. 5). As the filler flat is being moved to pickup position, the vacuum manifold, is being moved toward the right in FIG. 5 to the pickup position. During this movement toward the right, the manifold is held in a raised position by the actuator rod 171. When the pickup position shown in FIG. 5 is reached, the manifold is lowered until the roller 240 engages the cam rod 241 and the manifold comes to rest in this slightly lowered position.

It will also be noted that, during the movement of the manifold toward the right, the valve rod 301 is in a position projecting a considerable distance out of the right hand end of the tube 292, due to its engagement with stop 308 during a previous movement toward the left, and in this position all of the ports 291 (FIG. 9) are vented to atmosphere through the open end 292a of tube 292. However, a short time before the manifold reaches the pickup position of FIG. 5, the rod 301 engages the stop 306 causing the movement of the rod to be arrested while the manifold and the valve housing continue moving to the pickup position. Accordingly the center chamber of tube 292 is first put into communication with the nipple 296 leading to the vacuum pump and then each port 291 is in turn put into communication with the vacuumized chamber. When the manifold reaches the pickup position, all cups have been connected through conduits 288 to vacuum. Then, when the filler flat conveyor is lifted, the eggs in the flat engage the lower ends of the rubber vacuum cups and are gripped thereby. The gripping of each egg causes the cup to collapse as seen in FIG. 11, raising the egg out of the filler flat. It should be particularly noted that the rod 225 that carries the vacuum manifold can slide vertically and the manifold 222 (FIG. 5) is spaced below the valve body 221 a sufficient distance such that the manifold can be raised bodily at least ¼ inch. Therefore, if large eggs are being processed, the manifold can yield upwardly to accommodate them. The range of vertical movement is sufficient to provide for peewee as well as jumbo eggs.

When the eggs have been gripped by the vacuum cups and the manifold is moved to the left to carry the eggs to the roller conveyor 28, the roller 240 rides along cam rod 241 and, as the roller rides down the inclined surface 241a, the eggs are lowered until their lower ends are at an elevation a short distance above the upper edges of the rollers 335 and 336. As seen in FIG. 11A, the position of the inclined cam surface 241a must be coordinated with the position of the roller conveyor 28 so that the last row of eggs R6 will not be lowered before the eggs are clear of the side rail 326 of the conveyor.

In FIG. 9 the position of the valve rod 301 as the manifold moves to the left is shown. Just about the time the eggs in row R6 (FIG. 11A) are above the conveyor side rail 326, the valve rod engages stop 308 and its movement is arrested. Further movement of the manifold to the left starts the closing of the port 291 that leads to the manifold tube 270 associated with row R6. The eggs are not released immediately because, as mentioned previously, the openings 279 and 280 (FIG. 10) leading to each cup are only approximately .054" in diameter and these small openings delay the release of the eggs since the cup must fill with air through the restricted openings before the vacuum hold on the egg is broken. Also, as previously explained, as the vacuum is decreased in the cups, but before the eggs are released, the springs in the cups start the expansion of the cup and the controlled movement of the egg toward the conveyor. The timing is such that after the eggs of row R6 clear the side rail of the conveyor, the lowering of the manifold is completed and, during this lowering, the eggs are released. It is desirable that the lower end of each egg of row R6 contacts the roller substantially between the points X and X'. Then, as the manifold continues to the left, the egg will pivot counterclockwise about this point of contact and will come to rest in the pocket with its small end facing to the right.

After row R6 has been deposited, the manifold continues to move to the left and each row R5–R1 is released in turn and each egg assumes a substantially horizontal position in its associated pocket with its small end facing to the right.

At this point it should be noted that the eggs were introduced in filler flats into the machine with their small ends pointed downward. The vacuum cups maintained this orientation as they lifted the eggs from the flats and carried them to a position above the pockets of the roller conveyor 28. Then, due to the release of the eggs while the manifold is moving relative to the roller conveyor, the orientation of all eggs with their small ends facing to the right was accomplished.

When the manifold reaches the end of its travel to the left, the carriage is lifted approximately 9/16" by the actuator rod 171 as it starts its return movement to its home position.

As the eggs are carried along in the pockets of the roller conveyor 28, they are effectively cleansed in the washer 30, dried by heated air in the drier 32, and discharged over the end of the conveyor under the control of the cam-actuated linkage 525.

From the foregoing description it will be seen that the present invention provides a particularly effective means for automatically carrying eggs through an egg machine while maintaining a predetermined orientation of the eggs. The positioning of the transfer unit 25 at an angle to the roller conveyor 28 makes possible the effective depositing of eggs into pockets of conveyor 28 while both the vacuum manifold and the roller conveyor are in operation. The use of a shiftable valve rod with a movable vacuum manifold provides a simple, yet efficient mechanism for discharging the eggs in properly timed relation. The novel mounting for the drive shaft of the washer brush unit assures trouble-free, long life for the bearings of the shaft. Also, the simple blower system which draws air across the candling unit to cool it and then directs the heated air over the eggs to dry them is a particularly effective egg drying mechanism.

An important feature of the present invention is the use of the transfer mechanism 25 to transfer eggs between two parallel conveyors so that the conveyors can be placed alongside each other, forming a compact unit, as distinguished from the usual machine wherein the eggs are processed in aligned units which require a floor area having at least one long dimension to accommodate the straight line system.

While a particular embodiment of the present invention has been shown and described, it will be understood that the disclosed mechanisms are capable of modifications and variations without departing from the principles of the invention, and that the scope of the invention should be limited only by the scope and proper interpretation of the claims appended hereto.

We claim:

1. In an egg processing machine, an elongate feed conveyor, means mounting said conveyor for pivotal movement about a horizontal axis, a transfer unit having a carriage movable to a position above said feed conveyor at a pickup station, means for intermittently advancing said feed conveyor to move flats filled with eggs one-by-one to said pickup station, means on said carriage for gripping eggs moved upwardly into engagement therewith, means for intermittently actuating said transfer unit to move said carriage to and from said pickup station, a cam-actuating lifting mechanism for pivoting said feed conveyor about said horizontal axis to raise eggs into engagement with said gripping means, and means for coordinating the movement of said carriage and the movement of said feed conveyor with the actuation of said lifting means so that said lifting means is actuated only when said carriage and said feed conveyor are stationary.

2. In an egg processing machine, a feed conveyor adapted to convey filler flats of eggs to a pickup station with the small ends of the eggs facing downwardly in the flats, a processing conveyor spaced from said feed conveyor and having a plurality of longitudinal lanes of pockets, a transfer carriage having means for gripping the upper ends of eggs at said pickup station and carrying them in upright position across said processing conveyor, said egg-gripping means being arranged in rows that are oriented substantially parallel to the longitudinal lanes of said processing conveyor, and means for releasing the eggs row-by-row into said lanes as they are carried over said processing conveyor and orienting the eggs in horizontal position with the small ends of all of the eggs oriented in the same direction.

3. In an egg processing machine, a feed conveyor adapted to position a quantity of eggs at an egg pickup station, a processing conveyor adjacent said feed conveyor and including a longitudinally extending conveying surface having a plurality of egg-receiving pockets disposed in transverse lanes and longitudinal rows, means for driving said conveyor, a transfer mechanism having a frame and an egg gripping head including a plurality of gripping members disposed in rows that are substantially parallel to the rows of pockets in said processing conveyor, means mounting said head for movement on said frame along a predetermined path over said feed conveyor and over said processing conveyor, means for transferring eggs from a filler flat on said feed conveyor to said gripping head when said head is at said pickup station, means for moving said head along said predetermined path, said path extending transversely over said processing conveyor and forwardly in the direction of movement of the lanes of pockets on said conveyor, means for releasing the eggs row-by-row from said head during movement of said head along said path, and means for coordinating the speed of movement of said head over said processing conveyor with the speed of longitudinal movement of said pockets and with the release of said rows of eggs whereby each row of eggs on said head is discharged into a row of pockets on said processing conveyor during continuous movement of said head and of the conveying surface of said processing conveyor.

4. In an egg processing machine, means for supporting a plurality of eggs in fixed position at a pickup station, an egg-receiving member mounted adjacent said egg supporting means, a vacuum head mounted for movement from a position above said egg-supporting means to a discharge position above said egg-receiving member, a plurality of egg grippers mounted on said vacuum head, each gripper having an egg-contacting annulus at its lower end and an upper internal chamber defined by an upper wall, a side wall and a lower wall, said chamber being in communication with the opening defined by said annulus, a compression spring disposed in said chamber in engagement with said upper and lower walls, means for maintaining a vacuum condition in the chambers of said grippers when said head is at said pickup station, means for effecting the engagement of said annuli and the eggs positioned at said pickup station to cause said vacuumized grippers to grip the eggs and causing the lower wall of each gripper to move up into said chamber against the resistance of the spring therein, means for moving said head and the eggs gripped thereby from said pickup station to said discharge position above said egg-receiving member, and means for progressively releasing the vacuum in each chamber, the spring in each chamber being effective to move the lower wall of the gripper downwardly to lower the egg as the vacuum is released whereby each egg is lowered under control of the gripper and then released thereby.

5. An egg processing machine according to claim 4 wherein the means for progressively releasing the vacuum in the chamber of each gripper comprises a port communicating the chamber with a source of vacuum and a valve movable across said port to progressively close the port.

6. In an egg processing machine, a feed conveyor adapted to move filler flats of eggs to a pickup station, a stationary filler flat clamping member mounted on said conveyor at one side of said station and having an upper end portion overlying one side edge of said conveyor and the edge of a filler flat at said station, a movable clamping member pivotally mounted adjacent the opposite side edge of said conveyor at said pickup station and having an upper portion movable during pivoting of said clamping member from a position gripping the flat and partially overlying the side edge of the flat to a retracted position spaced from said gripping position, means for raising and lowering the section of said conveyor at said pickup station, means disposed above said conveyor at said station for gripping eggs on a filler flat as said conveyor section is elevated, spring means for pivoting said movable clamp member to position its upper portion in said flat-gripping position, and means responsive to the lowering of said conveyor section for pivoting said movable clamping member to said retracted position against the action of said spring.

7. In an egg processing machine, a feed conveyor adapted to move flats of eggs to a pickup station, an egg gripping mechanism disposed above said pickup station and having means for gripping eggs raised into engagement therewith, means for raising the portion of said conveyor at said pickup station to raise a flat of eggs upwardly and move the eggs into engagement with said gripping means, and a stripping mechanism carried by said conveyor and having members disposed in overlying relation to the flat on the conveyor to strip the flat from the eggs during downward movement of the conveyor after eggs have been gripped by said gripping means.

8. In an egg processing machine, a feed conveyor adapted to move filler flats of eggs to a pickup station, a stationary filler flat clamping member mounted adjacent one side edge of said conveyor at said pickup station and having an upper edge portion overlying said one side edge of the conveyor and the edge of a fillter flat of eggs at said station, a lever pivotally mounted adjacent the opposite side edge of said conveyor at said station, a movable clamping member mounted on said lever and having an upper portion movable during pivoting of said lever from a position gripping the flat and partially overlying the side edge of the flat to a retracted position spaced from said gripping position, means for raising and lowering the section of said conveyor at said pickup station, means disposed above said conveyor for gripping eggs on the filler flat as said conveyor section is elevated, spring means connected to said lever to pivot said lever in a direction to move said movable clamping member into gripping engagement with the flat, and a stationary abutment mounted in the path of downward movement of said lever to engage said lever and pivot said movable clamping member to said retracted position against the urgency of said spring.

9. In an egg processing machine, a feed conveyor adapted to position a quantity of eggs at an egg pickup station, a processing conveyor adjacent said feed conveyor and including a longitudinally extending conveying surface having a plurality of egg-receiving pockets disposed in transverse lanes and longitudinal rows, means for driving said conveyor, a transfer mechanism having a frame and an egg gripping head including a plurality of gripping members disposed in rows that are substantially parallel to the rows of pockets in said processing conveyor, means mounting said head for movement on said frame along a predetermined path over said feed conveyor and over said processing conveyor, means for transferring eggs from said feed conveyor to said gripping head when said head is at said pickup station, means for moving said head along said predetermined path, said path extending transversely over said processing conveyor and forwardly in the direction of movement of the lanes of pockets on said conveyor, means for releasing the eggs from said head during movement of said head along said path, means for coordinating the speed of forward movement of said head over said processing conveyor with the speed of longitudinal movement of said pockets and with the release of said rows of eggs whereby each row of eggs on said head is discharged into a row of pockets on said processing conveyor during continuous movement of said head and of the conveying surface of said processing conveyor.

10. In an egg processing machine, means for supporting a plurality of eggs in fixed position at a pickup station, an egg-receiving member mounted adjacent said egg supporting means, a vacuum head mounted for movement from a position above said egg-supporting means to a discharge position above said egg-receiving member, a plurality of egg grippers mounted on said vacuum head, each gripper having an egg-contacting annulus at its lower end and an upper internal chamber defined by an upper wall, a side wall and a lower wall, said chamber being in communication with the opening defined by said annulus, means for maintaining a vacuum condition in the chambers of said grippers when said head is at said pickup station, means for effecting the engagement of said annuli and the eggs positioned at said pickup station to cause said vacuumized grippers to grip the eggs and causing the lower wall of each gripper to move up into said chamber against the resistance of the spring therein and raise the eggs away from said egg-supporting means, means for moving said head and the eggs gripped thereby from said pickup station to said discharge position above said egg-receiving member, and means for releasing the vacuum in each chamber to permit the lower wall of the gripper to move downwardly to lower the egg.

11. In an egg processing machine, a feed conveyor adapted to position a quantity of eggs at an egg pickup station, a processing conveyor adjacent said feed conveyor and including a longitudinally extending conveying surface having a plurality of egg-receiving pockets disposed in transverse lanes and longitudinal rows, means for driving said conveyor, a transfer mechanism having a frame and an egg gripping head including a plurality of gripping members disposed in rows that are substantially parallel to the rows of pockets in said processing conveyor, means mounting said head for movement on said frame along a predetermined path over said feed conveyor and over said processing conveyor, means for transferring eggs from a filler flat on said feed conveyor to said gripping head when said head is at said pickup station, means for moving said head along said predetermined path, said path extending transversely over said processing conveyor and forwardly in the direction of movement of the lanes of pockets on said conveyor and means for releasing the eggs row-by-row from said head during movement of said head along said path into the rows of said conveyor with the upstream row on said head being discharged first onto said conveyor.

References Cited by the Examiner

UNITED STATES PATENTS

| | | | |
|---|---|---|---|
| 1,793,595 | 2/1931 | Douglass. | |
| 1,796,699 | 3/1931 | Wyland | 88—14.8 |
| 1,987,336 | 1/1935 | Powell. | |
| 2,371,128 | 3/1945 | Costa. | |
| 2,583,787 | 1/1952 | McCabe | 198—27 |
| 2,641,352 | 6/1953 | Charles | 198—27 |
| 2,655,013 | 1/1954 | Socke. | |
| 2,823,786 | 2/1958 | Grogg. | |
| 2,831,267 | 4/1958 | Gardner | 34—60 |
| 2,858,554 | 11/1958 | Beck | 15—3.13 |
| 2,919,820 | 1/1960 | Brookhyser. | |
| 2,979,746 | 4/1961 | Willsey | 15—3.13 |
| 2,996,808 | 8/1961 | Fleissner | 34—60 |
| 3,029,957 | 4/1962 | Freeman | 214—1 |
| 3,077,993 | 2/1963 | Mulvany. | |

FOREIGN PATENTS

| | | |
|---|---|---|
| 78,862 | 2/1955 | Denmark. |
| 713,889 | 8/1954 | Great Britain. |
| 94,766 | 10/1959 | Norway. |

MARVIN A. CHAMPION, *Primary Examiner.*

HUGO O. SCHULZ, *Examiner.*

UNITED STATES PATENT OFFICE
CERTIFICATE OF CORRECTION

Patent No. 3,252,607                        May 24, 1966

Boyd W. Rose et al.

It is certified that error appears in the above identified patent and that said Letters Patent are hereby corrected as shown below:

Column 4, line 52, "102a" should read -- 101a --. Column 5, line 54, after "endless" insert -- path --.

Signed and sealed this 17th day of March 1970.

(SEAL)
Attest:

Edward M. Fletcher, Jr.                  WILLIAM E. SCHUYLER, JR.
Attesting Officer                         Commissioner of Patents